Dec. 5, 1939.    C. V. ESKRIDGE    2,181,937

APPARATUS FOR HEATING METAL BODIES

Filed Jan. 15, 1938

INVENTOR
CECIL V. ESKRIDGE
BY
ATTORNEY

Patented Dec. 5, 1939

2,181,937

UNITED STATES PATENT OFFICE 2,181,937

APPARATUS FOR HEATING METAL BODIES

Cecil V. Eskridge, Chicago, Ill., assignor to Oxweld Acetylene Company, a corporation of West Virginia Application January 15, 1938, Serial No. 185,143

8 Claims. (Cl. 266—5)

This invention relates to apparatus for heating metal bodies, and more particularly to blowpipes and blowpipe heads which are adapted to be utilized in heating relatively wide surface areas of metal bodies for heat treating purposes, such as in flame hardening operations.

Blowpipe heads previously utilized for heating relatively wide surface areas are provided with a plurality of orifices or tips, usually disposed in staggered relation in several parallel rows and spaced as closely together as possible since heating flames directed from closely spaced orifices or tips tend to overlap and produce a more even heating effect. However, each of the prior blowpipe heads, being rectangular in shape, is limited in application since in attempting to heat a surface having a greater width than that for which the particular head is designed by placing a second head side by side or end to end with the first, an even heating effect over the entire width of the surface cannot be obtained due to a gap in the flame pattern occurring at the abutting edges of the heads. The tips or orifices in each individual head can not be placed sufficiently close to the edges of the heads so that the lateral distance between adjacent heating jets or flames directed by the heads is sufficiently small to produce the overlapping of flames and the more even heating effect achieved over the remainder of each head.

The objects of this invention are to provide apparatus, such as blowpipe heads, for heating uniformly varying widths of surfaces of metal bodies; and to provide apparatus consisting of two or more blowpipe heads which may be placed side by side or end to end to heat the surface of a metal body uniformly across the width thereof.

In accordance with this invention, two or more blowpipe heads are provided with cooperating ends or edges inclined with respect to the sides or with respect to two or more substantially parallel rows of heating outlets and the inclined ends or edges of adjacent blowpipes placed in abutting relationship. Such blowpipe heads are preferably substantially rhomboidal in shape, i. e. having opposite acute and obtuse angles, so that a tip or orifice in an acute corner may be spaced laterally a short distance from a tip or orifice in the acute corner of an adjacent head. This construction, as well as other objects and novel features, will become apparent from the following more detailed description and accompanying drawing, in which:

Figure 1:
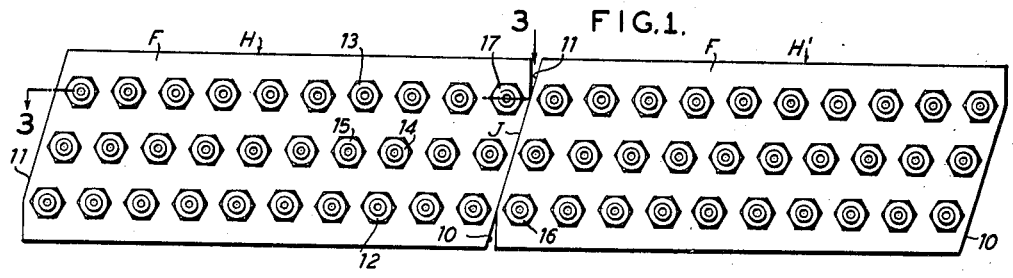
Fig. 1 is a plan view of the faces of a pair of rhomboidal blowpipe heads constructed in accordance with this invention.

The blowpipe heads H and H' of Fig. 1, having faces F disposed in the same plane and provided with inclined ends 10 and 11 and a plurality of tips preferably disposed in a plurality of parallel rows (three in the present example) with the tips of one row being disposed in staggered relation with respect to the tips of an adjacent row to form parallel diagonal rows, when placed side by side or in end to end abutting relationship, will produce a uniform heating effect over the width of the surface to be treated. The tips of each of the rows are spaced the same distance apart, and due to the staggering of the tips in the three rows shown, the lateral distance between a tip in a lower or front row, such as tip 12 of head H, and a succeeding or laterally adjacent tip in an upper or back row, such as tip 13, will be less than the lateral distance between any two adjacent tips of the same row. In the same manner, the lateral distance between any two tips 14 and 15 in the middle row and the tips 12 and 13, respectively, will be the same as the lateral distance between the tips 12 and 13. Furthermore, at joint J where the heads H and H' abut, the lateral distance between a tip 16 in an acute corner of the face of the head H' and a tip 17 in an acute corner of the head H will be the same as the lateral distance between tips 12 and 13, tips 14 and 12, tips 13 and 15, etc. In addition, since the distance between the outlets at the end of each row adjacent the abutting ends of the heads will be spaced from each other the same distance as any two adjacent outlets anywhere else in each row, not only continuous lateral parallel rows but also evenly spaced parallel diagonal rows will be formed. From the above, it can be seen that when a surface is traversed by the two blowpipe heads in unison, the heating effect over the entire width of the area will be uniform. Moreover, a surface having a width greater than the effective heating width of any single one of such blowpipe heads can be heated uniformly by two or more of such blowpipe heads placed in mutually abutting end to end relation.

Figure 2:
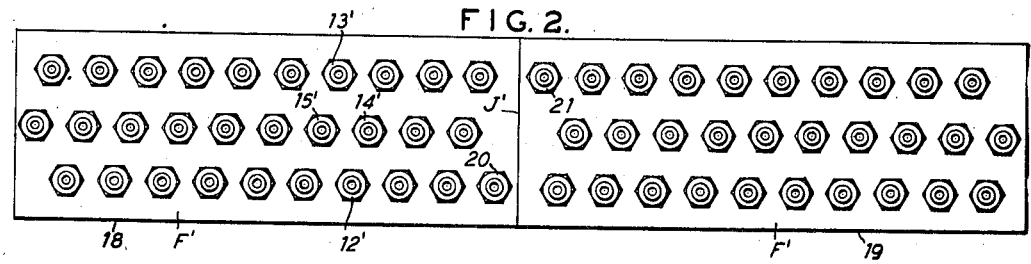
Fig. 2 is a plan view of the faces of a pair of rectangular blowpipe heads.

The advantages of blowpipe heads having inclined edges or rhomboidal shaped faces are further brought out by comparison with the heating effects of heads 18 and 19 of Fig. 2, in which the faces F' are rectangular in shape. In these heads, the tips are arranged in staggered relation in three parallel rows and in parallel diagonal rows, as in the heads H and H', and the lateral distance between the tips 12' and 13', 14' and 12', and 13' and 15', will be the same as the distances between corresponding tips of the head H. However, the lateral distance between tip 20 of head 18, which is closest to head 19, and tip 21 of head 19, which is closest to head 18, will be greater than the lateral distance between other laterally adjacent tips, such as 12' and 13'. It can therefore be seen that while in the case of the heads of Fig. 1, continuous parallel lateral rows of tips and also evenly spaced parallel diagonal rows of tips will be provided, in the case of the heads of Fig. 2, continuous parallel lateral rows of tips will not be provided, and there will be a gap in the parallel diagonal rows of tips at joint J' where the heads 18 and 19 abut. The gap or zone of lesser heating effect in the region along the joint J' will cause an unequal heating effect and a resultant disparity in hardness.

Although drilled orifices may be substituted for the removable tips of the heads H and H', it is more desirable to utilize removable tips, since a greater variety of widths of surfaces may be treated by replacing temporarily unnecessary tips with suitable plugs. Furthermore, it is not necessary that the heads H and H' have the same width, inasmuch as heads having cooperating inclined edges but having different widths may be placed side by side or end to end to produce an even heating effect over the entire width.

Figure 3:
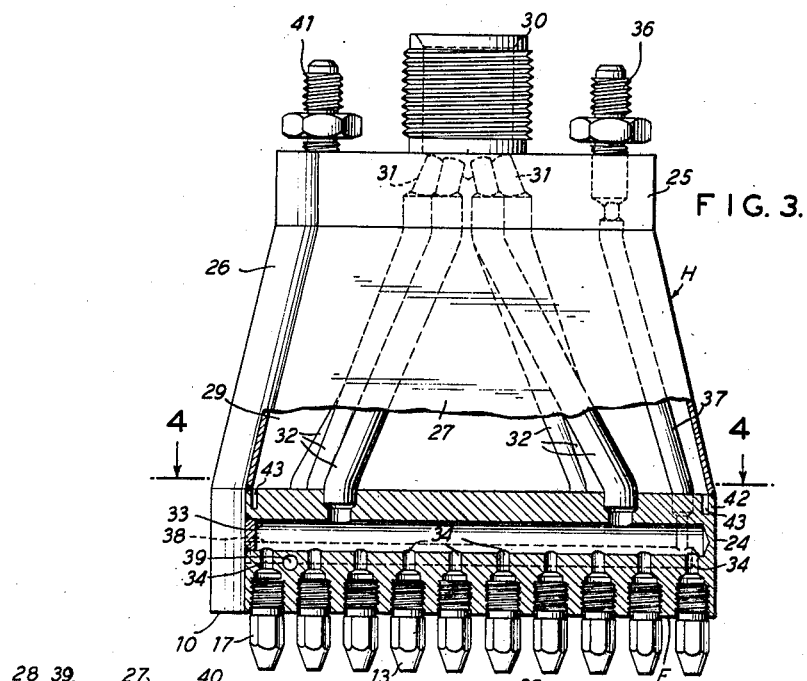
Fig. 3 is a side view, partially in section along the line 3—3 of Fig. 1, of one of the blowpipe heads of Fig. 1.
Figure 4:
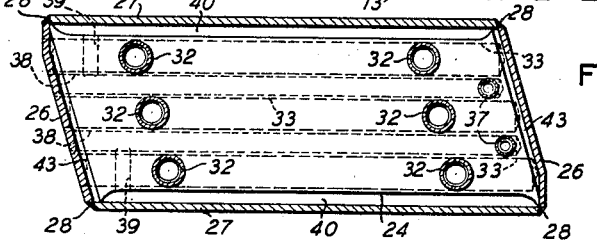
Fig. 4 is a sectional view taken along the line 4—4 of Fig. 3.

In order to provide adequate cooling of the head and an equalized distribution of gases to the tips, a construction similar to that of the head H, as illustrated in Figs. 3 and 4, may be utilized. The head H is provided with a rhomboidal lower block 24, a rhomboidal upper block 25, and plates 26 and 27 united to the upper and lower blocks and to each other by suitable means, such as welds 28, so as to form a jacket for a space 29.

The upper block 25 is provided with a combustible gas mixture inlet 30, from which lead distributing passages 31 connecting with tubes 32, which convey the combustible mixture to three headers or channels 33, one for each row of tips, in the lower block. Individual passages 34, threaded to accommodate the removable tips, lead from the headers 33, the passages 34 being disposed in the same relative positions as the tip arrangement shown in Fig. 1. In order to equalize the distribution of the combustible mixture, the passages 31 are equally disposed radially about the lower end of the combustible mixture inlet, and the tubes 32, preferably six in number, connect with the headers 33 at points intermediate the openings of two individual passages 34, so that the combustible mixture will not be discharged directly into one of the individual passages and thereby cause its associated tip to receive a greater amount of mixture than otherwise.

The upper block 25 is also provided with a cooling fluid inlet 36, from which a pair of tubes 37 convey the cooling fluid to two headers or channels 38, formed in the lower block 24 and disposed between the combustible mixture headers 33, as in Fig. 4. The cooling fluid is introduced into one end of the headers 38 and flows to the other end thereof, being conducted by two cross-passages 39, each located between two of the tip passages 34, to spaces 40, which are formed between the block 24 and the plates 27 by grooves machined in the block 24 and extending downwardly to within a short distance of the face F.

The cooling fluid, after passing through and then around the block 24 to cool the same, circulates through the space 29, cooling the tubes 32 and the combustible mixture passing therethrough, thereby assisting in the prevention of flashbacks which otherwise might occur due to the combustible mixture becoming too highly heated prior to actual combustion. The cooling fluid is led from the space 29 by an outlet 41, communicating therewith through the upper block 25.

Lips 42, formed along the upper ends of the block 24 by grooves 43, permit the relatively thin plates 27 to be welded to the block without the plates 27 becoming overheated. Grooves 43 may be deepened to serve the same purpose as the spaces 40. The relatively thin shelf-like flanges forming the bottom of the spaces 40 will prevent overheating of lower portions of the relatively thin plates 27 during welding. It is to be understood, of course, that methods of attaching the plates 26 and 27 to the blocks 24 and 25 other than welding may be utilized.

The combustible mixture may be supplied by any suitable device, such as a blowpipe body or handle provided with suitable means for forming the combustible mixture, and supplied with a combustion supporting gas and a combustible gas, preferably oxygen and acetylene. Also, the cooling fluid inlet 36 is connected to a suitable supply of cooling fluid, such as water.

Although a particular embodiment of this invention has been described in detail, it will be understood that more than two blowpipe heads similar to those shown in Fig. 1 may be used in side by side or end to end abutting relationship, and that other changes may be made which will not depart from the spirit and scope of this invention.

What is claimed is:

1. Apparatus for heating metal bodies comprising at least two blowpipe heads individually provided with a plurality of outlets disposed in a plurality of substantially parallel rows, the outlets of each row being disposed in staggered relation with respect to the outlets of an adjacent row, said heads having mutually abutting edges inclined with respect to said parallel rows of outlets; and means for supplying a combustible mixture of gases to said outlets.

2. A blowpipe head having a plurality of substantially parallel rows of outlets for directing heating flames onto a metal body, the outlets of each row being disposed in staggered relation to the outlets of an adjacent row, said head having at least one edge thereof inclined with respect to said rows of outlets, said head and its outlets being so constructed and arranged that two or more heads may be placed side by side with their inclined edges in abutting relationship to increase the width of heat applied by either head while maintaining the relation of the outlets of both heads together the same as the relation of the outlets of either head.

3. A blowpipe head for heating a metal body, said head having a substantially rhomboidal shape and a face of the same shape, said face having heating gas outlets disposed in rows parallel to two opposite edges of said face and also disposed in other rows parallel to the other two opposite edges of said face and thereby oblique to the first named rows, said head and its outlets being so constructed and arranged that two or more of such heads may be placed side by side in abutting relationship with their faces in the same plane to increase the width of heat applied by either head while maintaining the relation of the outlets of both heads together the same as the relation of the outlets of either head.

4. Apparatus for heating metal bodies including at least two blowpipe heads having rhomboidal shaped faces disposed with inclined edges in abutting relationship; a plurality of outlets in each of said faces, said outlets being disposed in a plurality of rows and the outlets of each row being staggered with respect to the outlets in an adjacent row so that with the heads in abutting relationship the outlets will be so disposed that there will be substantially the same amount of heat directed onto a metal body over the area adjacent the abutting edges as over the remainder of the heads; and means for supplying a combustible mixture of gases to said outlets.

5. Apparatus as defined in claim 4, in which the outlets of each row are disposed at substantially the same distance from each other, and the outlets at the end of each row adjacent the abutting edges of each of said heads are spaced from each other substantially the same distance as the remainder of the outlets in each row.

6. Apparatus for heating metal bodies comprising a plurality of blowpipe heads, each of said blowpipe heads having an end inclined with respect to the sides thereof to form an acute corner and an obtuse corner, and a plurality of outlets disposed in rows substantially parallel to the sides of said heads for directing high temperature heating flames upon a surface portion of a metal body, such surface portion having a width greater than the effective heating width of any one of said blowpipe heads and said heads being placed with an inclined edge of one blowpipe head abutting an inclined edge of a second blowpipe head so that an outlet in an acute corner of one blowpipe head will be spaced laterally from an outlet in an acute corner of an adjacent blowpipe head a distance no greater than the lateral distance between any two outlets in either of said heads.

7. A blowpipe head for heating a metal body, said head having heating gas outlets disposed in parallel rows and also disposed in other parallel rows oblique to the first named rows, and said head having a face provided with an end inclined with respect to said first named parallel rows and parallel to said oblique parallel rows, said head and its outlets being so constructed and arranged that two or more heads may be placed side by side with their inclined ends in abutting relationship and with their faces in the same plane to increase the width of heat applied by either head while maintaining the relation of the outlets of both heads together the same as the relation of the outlets of either head.

8. A blowpipe head for heating a metal body, as defined in claim 7, in which each end of the face of said head is inclined with respect to said first named parallel rows and each end is also parallel to said oblique rows.

CECIL V. ESKRIDGE.